United States Patent
Keogh

(10) Patent No.: US 6,203,907 B1
(45) Date of Patent: Mar. 20, 2001

(54) TREE RESISTANT CABLE

(75) Inventor: Michael John Keogh, Bridgewater, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/062,852

(22) Filed: Apr. 20, 1998

(51) Int. Cl.[7] ............... B32B 15/00; H01B 7/00; C08L 23/00

(52) U.S. Cl. ........... 428/379; 428/383; 174/110 PM; 174/110 SR; 174/113 R; 525/240

(58) Field of Search .................... 428/379, 383; 174/110 SR, 110 PM, 113 R; 525/240

(56) References Cited

U.S. PATENT DOCUMENTS

| | | | |
|---|---|---|---|
| 3,361,702 | * 1/1968 | Wartman | 260/33.2 |
| 3,660,339 | 5/1972 | Schuh | 260/29.7 D |
| 4,013,622 | * 3/1977 | Dejuneas et al. | 260/45.95 |
| 4,305,849 | * 12/1981 | Kawasaki et al. | 252/567 |
| 4,440,671 | * 4/1984 | Turbett | 252/573 |
| 4,451,536 | * 5/1984 | Barlow et al. | 428/383 |
| 4,612,139 | * 9/1986 | Kawasaki et al. | 252/511 |
| 4,812,505 | * 3/1989 | Topcik | 524/377 |

FOREIGN PATENT DOCUMENTS

| | | |
|---|---|---|
| 0453929 | 10/1991 | (EP) . |
| 0735545 | 10/1996 | (EP) . |
| 59-152927 | 8/1984 | (JP) . |

* cited by examiner

*Primary Examiner*—William Krynski
*Assistant Examiner*—J. M. Gray
(74) *Attorney, Agent, or Firm*—Saul R. Bresch

(57) ABSTRACT

A composition comprising polyethylene and, for each 100 parts by weight of polyethylene, about 0.1 to about 3 parts by weight of the reaction product of (i) an aliphatic diacid anhydride or a polymer or copolymer thereof wherein the anhydride has 4 to 20 carbon atoms; and (ii) a polymer selected from the group consisting of a polycaprolactone, a polyalkylene glycol, a monoalkyl ether of a polyalkylene glycol, and a mixture of two or more of said polymers, the weight ratio of component (ii) to component (i) being in the range of about 0.05:1 to about 1:1.

9 Claims, No Drawings

TREE RESISTANT CABLE

TECHNICAL FIELD

This invention relates to electric power cable insulated with a polyethylene composition having an improved resistance to water trees.

BACKGROUND INFORMATION

A typical electric power cable generally comprises one or more conductors, which form a cable core that is surrounded by several layers of polymeric material including a first semiconducting shield layer, an insulating layer, a second semiconducting shield layer, a metallic tape or wire shield, and a jacket.

These insulated cables are known to suffer from shortened life when installed in an environment where the insulation is exposed to water, e.g., underground or locations of high humidity. The shortened life has been attributed to the formation of water trees, which occur when an organic polymeric material is subjected to an electrical field over a long period of time in the presence of water in liquid or vapor form. The net result is a reduction in the dielectric properties of the insulation.

Many solutions have been proposed for increasing the resistance of organic insulating materials to degradation by water treeing. The most recent solution involves the addition of polyethylene glycol (PEG), as a water tree growth inhibitor, to a heterogeneous low density polyethylene such as described in U.S. Pat. Nos. 4,305,849; 4,612,139; and 4,812,505. The addition of PEG to polyethylene, however, presents certain problems, particularly in the areas of process and long term heat stability and in compatibility with the host polymer. The latter is addressed by selecting a PEG of a particular molecular weight (weight average molecular weight); however, compounding conditions may still produce a low molecular weight fraction. The former requires the addition of a high level of certain heat stabilizers, which cause staining of the composition. The color (or stain) produced and the reduction in crosslinking, both due to the high level of heat stabilizer, lead to some commercial difficulties. Thus, there is an industrial demand for water tree retardant additives that are as effective as PEG, but do not present stability and compatibility concerns.

DISCLOSURE OF THE INVENTION

An object of this invention, therefore, is to provide a polyethylene composition, which exhibits a much improved resistance to water trees. Other objects and advantages will become apparent hereinafter.

According to the invention, a composition has been discovered which meets the above object.

Such a composition comprises polyethylene and, for each 100 parts by weight of polyethylene, about 0.1 to about 3 parts by weight of the reaction product of (i) an aliphatic diacid anhydride or a polymer or copolymer thereof wherein the anhydride has 4 to 20 carbon atoms; and (ii) a polymer selected from the group consisting of a polycaprolactone, a polyalkylene glycol, a monoalkyl ether of a polyalkylene glycol, and a mixture of two or more of said polymers, the weight ratio of component (ii) to component (i) being in the range of about 0.05:1 to about 1:1.

DESCRIPTION OF THE PREFERRED EMBODIMENT(S)

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture of such homopolymers and copolymers. The mixture can be a mechanical blend or an in situ blend. Examples of the alpha-olefins are propylene, 1-butene, 1-hexene, 4-methyl-1-pentene, and 1-octene.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes of interest here can have a density in the range of 0.860 to 0.950 gram per cubic centimeter, and preferably have a density in the range of 0.870 to 0.925 gram per cubic centimeter. They also can have a melt index in the range of about 0.1 to about 20 grams per 10 minutes, and preferably have a melt index in the range of about 0.5 to about 5 grams per 10 minutes. The polyethylenes can be produced by low or high pressure processes. Under low pressure, they are preferably produced in the gas phase, but they can also be produced in the liquid phase in solutions or slurries by conventional techniques. Low pressure processes are typically run at pressures below 1000 psi whereas high pressure processes are typically run at pressures above 15,000 psi. Typical catalyst systems, which can be used to prepare these polyethylenes, are organic peroxides for high pressure processes and, for low pressure processes, magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as that described in U.S. Pat. Nos. 4,937,299 and 5,317,036 (homogeneous polyethylenes); or other transition metal catalyst systems. Many of these catalyst systems are often referred to as Ziegler-Natta catalyst systems. Catalyst systems, which use chromium or molybdenum oxides on silica-alumina supports, are also useful. Typical processes for preparing the polyethylenes are also described in the aforementioned patents. Typical in situ polyethylene blends and processes and catalyst systems for providing same are described in U.S. Pat. No. Nos. 5,371,145 and 5,405,901. The various polyethylenes can include low density homopolymers of ethylene (made by high pressure processes), linear low density polyethylenes, very low density polyethylenes, and medium density polyethylenes. The latter three polyethylenes are generally made by low pressure processes. A conventional high pressure process is described in Introduction to Polymer Chemistry, Stille, Wiley and Sons, N.Y., 1962, pages 149 to 151.

The reaction product of component (ii) and component (i), which is a water tree growth inhibitor, is present in the composition in an amount of about 0.1 to about 3 parts by weight for each 100 parts by weight of the primary polymer, which is polyethylene. [The acronym pph may be used. This stands for parts per hundred.] The reaction product is formed by a condensation reaction between the two components. The condensation reaction occurs under normal compounding process conditions for polyethylene hence no additional manufacturing step is introduced. The reaction product is preferably present in an amount of about 0.5 to about 2.5 parts by weight. It is understood that other polymers can be present in addition to the primary polymer, e.g., polypropylene, polybutylene, ethylene/propylene copolymer rubber, and ethylene/propylenen/diene terpolymer rubber, but the amount of these additional polymers will be based on the primary polymer.

The weight ratio of component (ii) to component (i) is in the range of about 0.05:1 to about 1:1, and is preferably in the range of about 0.1:1 to about 0.5:1.

Component (i) is a an aliphatic diacid anhydride or a polymer or copolymer thereof wherein the anhydride has 4 to 20 carbon atoms. The copolymer is considered to be a polymer of two or more monomers. Particularly included are terpolymers and graft copolymers of the anhydride. The copolymers can be formed by addition or grafting. Examples of monomers which can be used in the copolymer or graft copolymer are ethylene, propylene, 1-butene, 1-hexene, 1-octene, 1-decene, and 1-octadecene. One example is a poly (1-alkyl-unsaturated aliphatic diacid anhydride) alternating copolymer wherein the alkyl group has at least 6 carbon atoms and the anhydride has 4 to 20 carbon atoms. The alkyl group preferably has 8 to 18 carbon atoms, and the anhydride preferably has 4 to 8 carbon atoms. Examples of the alkyl group are 1-octadecene, 1-decene, and 1-octene. Examples of the anhydride are maleic anhydride (preferred), itaconic anhydride, and nadic anhydride. Specific examples of component (i) are poly (1-octadecene/maleic anhydride) alternating copolymer and poly(1-decene/maleic anhydride) alternating copolymer.

Component (ii) can be a polycaprolactone, a polyalkylene glycol, a monoalkyl ether of a polyalkylene glycol, or a mixture of two or more of said polymers. Each polymer of component (ii) can have a molecular weight in the range of about 300 to about 35,000. Mixtures of polycaprolactone and polyalkylene glycol are particularly effective.

Conventional additives, which can be introduced into the polyethylene formulation, are exemplified by antioxidants, coupling agents, ultraviolet absorbers or stabilizers, antistatic agents, pigments, dyes, nucleating agents, reinforcing fillers or polymer additives (referred to above), slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Fillers and additives can be added in amounts ranging from less than about 0.1 to more than about 200 parts by weight for each 100 parts by weight of the base resin, in this case, polyethylene.

The use of carbon black in semiconductive layers is mentioned in U.S. Pat. No. 4,857,232. Anhydride grafting is mentioned in U.S. Pat. No. 5,262,467.

Examples of antioxidants are: hindered phenols such as tetrakis [methylene (3,5-di-tert-butyl-4-hydroxyhydrocinnamate)] -methane, bis [(beta-(3,5-ditert-butyl-4-hydroxybenzyl)-methylcarboxyethyl)] sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of polyethylene.

The resins in the formulation can be crosslinked by adding a crosslinking agent to the composition or by making the resin hydrolyzable, which is accomplished by adding hydrolyzable groups such as —Si(OR)$_3$ wherein R is a hydrocarbyl radical to the resin structure through copolymerization or grafting.

Suitable crosslinking agents are organic peroxides such as dicumyl peroxide; 2,5-dimethyl-2,5-di(t-butylperoxy) hexane; t-butyl cumyl peroxide; and 2,5-dimethyl-2,5-di(t-butylperoxy)hexane-3. Dicumyl peroxide is preferred.

Hydrolyzable groups can be added, for example, by copolymerizing ethylene and comonomer(s) with an ethylenically unsaturated compound having one or more —Si(OR)$_3$ groups such as vinyltrimethoxy-silane, vinyltriethoxysilane, and gamma-methacryloxypropyltrimethoxysilane or grafting these silane compounds to the either resin in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred.

Examples of hydrolyzable copolymers and hydrolyzable grafted copolymers are ethylene/comonomer/vinyltrimethoxy silane copolymer, ethylene/comonomer/gamma-methacryloxypropyltrimethoxy silane copolymer, vinyltrimethoxy silane grafted ethylene/comonomer copolymer, vinyltrimethoxy silane grafted linear low density ethylene/1-butene copolymer, and vinyltrimethoxy silane grafted low density polyethylene or ethylene homopolymer.

Cables using the composition of this invention can be prepared in various types of extruders, e.g., single or twin screw types. Compounding can be effected in the extruder or prior to extrusion in a conventional mixer such as a Brabender™ mixer; a Banbury™ mixer; or the twin screw extruder. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C.

The advantages of the composition of the invention lie in the much improved water tree growth rate of the insulating layer in which the composition is used, and the permanence of the additives from the condensation reaction. The composition is useful in low, medium, and high voltage applications.

It will be understood by those skilled in the art that the water tree growth inhibitors cause the composition of the invention to have an elevated dissipation factor. This causes the cable to be relatively less efficient in transporting electricity over long distances.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

All molecular weights mentioned in this specification are weight average molecular weights unless otherwise designated.

The patents mentioned in this specification are incorporated by reference herein.

The invention is illustrated by the following examples.

EXAMPLES 1 to 5

The resistance of insulating compositions to water treeing is determined by the method described in U.S. Pat. No. 4,144,202. This measurement leads to a value for water tree resistance relative to a standard polyethylene insulating material. The term used for the value is "water tree growth rate" (WTGR). The lower the values of WTGR, the better the water tree resistance. The WTGR values are stated in percent.

The water tree length is determined by the average of 10 specimens with the measured longest tree length in each test specimen. The percentage of water tree growth length is the average of 10 specimens with the calculated ratio of the measured longest tree length divided to point-to plane distance for each specimen. The test method is ASTM D 6097-97.

The homopolymers of ethylene and the additives described below are compounded in a twin screw BRABENDER™ extruder with a primary antioxidant and a secondary antioxidant. The extruder is run at 60 revolutions per minute (rpm) at a 155 degree C. melt temperature. A second pass in the same equipment under the same conditions is run in order to better homogenize the mixture. To this mixture (held at 75 degrees C.) is added dicumyl peroxide via a 125 to 130 degree C. fluxing on a two roll mill to provide an oscillating disk rheometer (5 degree arc at 360 degrees F.) reading of 5 inch-pounds of torque. Each composition is then removed from the two roll mill as a crepe and diced and molded into one inch discs which are 0.25 inch thick in a press in two steps:

|  | initial step | final step |
| --- | --- | --- |
| pressure (psi) | low | high |
| temperature (° C.) | 120 | 175 |
| residence time (minutes) | 9 | 15 to 20 |

Composition A:

100 parts by weight of an ethylene homopolymer having a density of 0.923 gram per cubic centimeter and a melt index of 2 grams per 10 minutes, and prepared by a conventional high pressure process.

0.2 part by weight of primary antioxidant, thiodiethylene bis(3,5-di-tert-butyl-4-hydroxy)hydro-cinnamate 0.2 part by weight of secondary antioxidant, distearyl thio dipropionate 1.8 parts by weight of dicumyl peroxide. [Melt index is determined under ASTM D-1238, Condition E, at 190 degrees C and 2.16 kilograms. Flow index is determined under ASTM D-1238, Condition F, at 190 degrees C and 21.6 kilograms.]

Composition B:

100 parts by weight of an ethylene homopolymer having a density of 0.923 gram per cubic centimeter and a melt index of 2 grams per 10 minutes, and prepared by a conventional high pressure process.

0.2 part by weight of primary antioxidant, thiodiethylene bis(3,5-di-tert-butyl-4-hydroxy)hydro-cinnamate 0.2 part by weight of secondary antioxidant, distearyl thio dipropionate 1.8 parts by weight of dicumyl peroxide 0.5 part by weight of polyethylene glycol having a weight average molecular weight of 20,000.

Additive (i)=poly(1-octadecene/maleic anhydride) alternating copolymer.

Additive (ii)=polycaprolactone having a weight average molecular weight of about 5000.

Each resin formulation is tested for WTGR and the results are compared with a control polyethylene homopolymer, which exhibits 100 percent WTGR. The results are set forth in the following Table:

TABLE

| Example | Composition | Additive | Tree Length (millimeters) | Tree Length (%) | WTGR (%) |
| --- | --- | --- | --- | --- | --- |
| 1 | A | — | 0.42 ± 0.11 | 13.5 ± 3.5 | — |
| 2 | B | — | 0.197 ± 0.026 | 6.0 ± 0.7 | 16 |
| 3 | A | (i) (1 wt %) | 0.389 ± 0.075 | 12.2 ± 2.3 | 80 |
| 4 | A | (ii) (1 wt %) | 0.251 ± 0.039 | 7.5 ± 1.2 | 28 |
| 5 | A | (i) and (ii) (each 0.5 wt %) | 0.101 ± 0.024 | 3.1 ± 0.7 | 3 |
| 6 | B | (i) 0.5 wt % (ii) 0.05 wt % | 0.148 ± 0.013 | 4.7 ± 0.4 | 8 |

The above results are confirmed by the extrusion coating of the resin formulations on 14 AWG (American Wire Gauge) copper and appropriate testing of the coated wires. The thickness of tings is 50 mils.

What is claimed is:

1. A composition comprising polyethylene and, for each 100 parts by weight of polyethylene, about 0.1 to about 3 parts by weight of the reaction product of (i) an aliphatic diacid anhydride or a polymer or copolymer thereof wherein the anhydride has 4 to 20 carbon atoms; and (ii) a polycaprolactone polymer, the weight ratio of component (ii) to component (i) being in the range of about 0.05:1 to about 1:1.

2. The composition defined in claim 1 wherein the reaction product is present in an amount of about 0.5 to about 2.5 parts by weight.

3. The composition defined in claim 1 wherein said polycaprolactone has a molecular weight in the range of about 300 to about 35,000.

4. The composition defined in claim 1 wherein the weight ratio of component (ii) to component (i) is in the range of about 0.1:1 to about 0.5:1.

5. The composition defined in claim 1 wherein the composition has a WTGR value less than about 15 percent and the polyethylene is a low density homopolymer of ethylene prepared by a high pressure process having a density in the range of 0.900 to 0.930 gram per cubic centimeter and a melt index in the range of about 0.1 to about 20 grams per 10 minutes.

6. A composition having a WTGR value less than about 15 percent comprising a low density homopolymer of ethylene prepared by a high pressure process having a density in the range of 0.900 to 0.930 gram per cubic centimeter and a melt index in the range of about 0.1 to about 20 grams per 10 minutes and, for each 100 parts by weight of the homopolymer, about 0.5 to about 2.5 parts by weight of the reaction product of (i) maleic anhydride or a polymer or copolymer thereof and (ii) a polycaprolactone polymer, having a molecular weight in the range of about 300 to about 35,000 and the weight ratio of component (ii) to component (i) being in the range of about 0.1:1 to about 0.5:1.

7. The composition defined in claim 6 wherein component (i) is poly(1-octadecene/maleic anhydride)alternating copolymer and component (ii) is polycaprolactone.

8. A cable comprising one or more electrical conductors or a core of one or more electrical conductors, each conductor or core being surrounded by a layer of insulation comprising polyethylene and, for each 100 parts by weight of polyethylene, about 0.1 to about 3 parts by weight of the reaction product of (i) an aliphatic diacid anhydride or a polymer or copolymer thereof wherein the anhydride has 4 to 20 carbon atoms; and (ii) a polycaprolactone polymer, the weight ratio of component (ii) to component (i) being in the range of about 0.05:1 to about 1:1.

9. A cable comprising one or more electrical conductors or a core of one or more electrical conductors, each conductor or core being surrounded by a layer of insulation comprising a composition having a WTGR value less than about 15 percent comprising a low density homopolymer of ethylene prepared by a high pressure process having a density in the range of 0.900 to 0.930 gram per cubic centimeter and a melt index in the range of about 0.1 to about 20 grams per 10 minutes and, for each 100 parts by weight of the homopolymer, about 0.5 to about 2.5 parts by weight of the reaction product of (i) maleic anhydride or a polymer or copolymer thereof and (ii) a polycaprolactone polymer, having a molecular weight in the range of about 300 to about 35,000 and the weight ratio of component (ii) to component (i) being in the range of about 0.1:1 to about 0.5:1.

* * * * *